(12) United States Patent  
Umezawa et al.

(10) Patent No.: US 6,466,335 B1  
(45) Date of Patent: Oct. 15, 2002

(54) IMAGE FORMING APPARATUS

(75) Inventors: Hiroki Umezawa; Atsushi Kubota, both of Shizuoka-ken; Hidehiro Watanabe, Tokyo-to, all of (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 0 days.

(21) Appl. No.: 09/237,422

(22) Filed: Jan. 26, 1999

(30) Foreign Application Priority Data

Jan. 28, 1998 (JP) .......................................... 10-015382

(51) Int. Cl.$^7$ ................................................. H04N 1/40
(52) U.S. Cl. ........................................ 358/1.9; 382/251
(58) Field of Search ................... 358/1.9; 382/251–253, 382/267–268, 269

(56) References Cited

U.S. PATENT DOCUMENTS

| | | | |
|---|---|---|---|
| 4,833,546 A | * 5/1989 | Numakura et al. | 358/283 |
| 4,905,027 A | 2/1990 | Itoh | 346/160 |
| 5,175,635 A | 12/1992 | Yamada et al. | 358/467 |
| 5,200,831 A | 4/1993 | Tai | 358/298 |
| 5,232,294 A | 8/1993 | Inui | 400/120 |
| 5,361,142 A | 11/1994 | Semasa | 358/455 |
| 5,648,801 A | 7/1997 | Beardsley et al. | 347/15 |
| 5,956,157 A | * 9/1999 | Tai | 358/455 |
| 6,259,539 B1 | * 7/2001 | Hamano et al. | 358/462 |
| 6,270,181 B1 | * 8/2001 | Ota | 347/15 |

FOREIGN PATENT DOCUMENTS

EP 1023999 A2 * 8/2000

\* cited by examiner

*Primary Examiner*—Thomas D. Lee  
*Assistant Examiner*—Stephen Brinich  
(74) *Attorney, Agent, or Firm*—Frishauf, Holtz, Goodman & Chick, P.C.

(57) ABSTRACT

Image data of 256 gradations is converted into that of 4 gradations which can be recorded by a recording head, at a pseudo-halftone processing unit and the converted image data is supplied to a head driving unit. A control signal selector selects a control signal A from a control signal A setting unit when the image data is a natural image, and a control signal B from a control signal B setting unit when the image data is a character or a line drawing. The head driving unit generates an electric signal used to drive the recording head on the basis of gradation information from the pseudo-halftone processing unit and the control signal A or B. With this operation, when the image data is a natural image, recording is carried out with a pixel dot for image formation excellent in gradation property, and when the image data is a character or a line drawing, recording is carried out with a pixel dot for image formation which causes no jaggy or blur to be generated at hatched portions and the like.

3 Claims, 3 Drawing Sheets

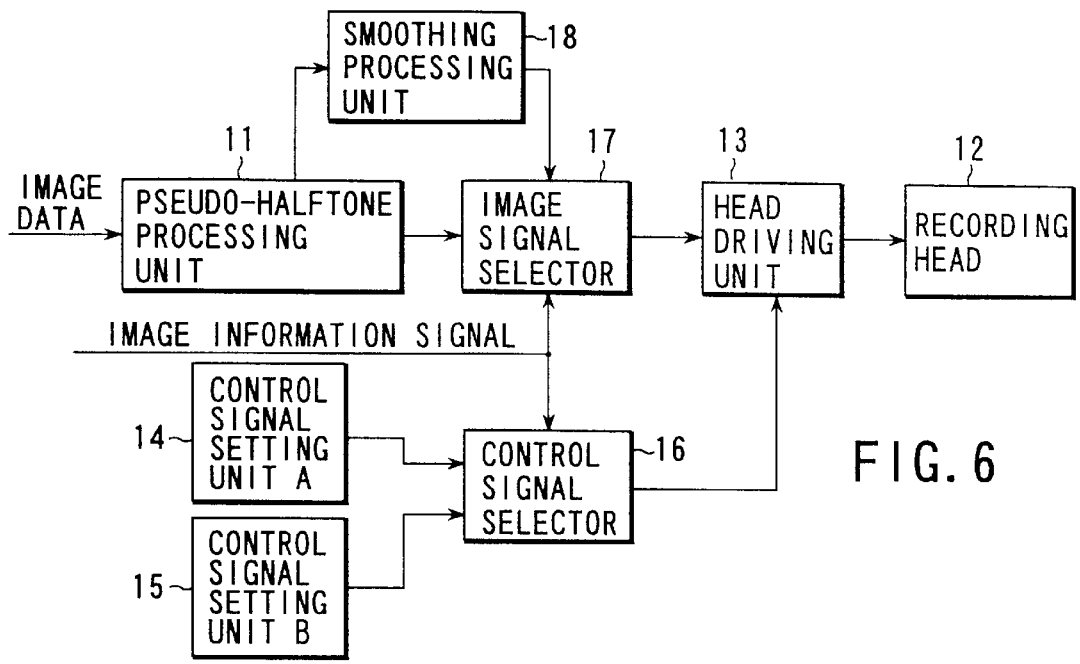
FIG. 6
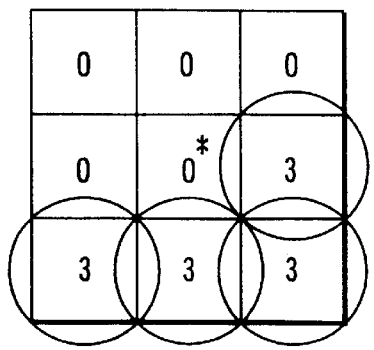
FIG. 7A
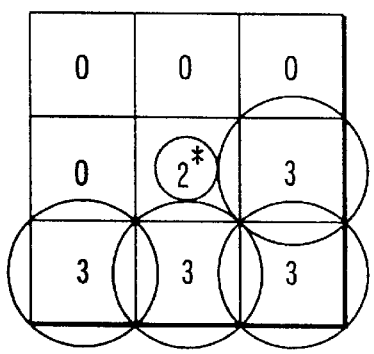
FIG. 7B
FIG. 8A
FIG. 8B

IMAGE FORMING APPARATUS

BACKGROUND OF THE INVENTION

The present invention relates to an image forming apparatus for forming an image by recording a pixel dot on a recording medium by each recording element arranged on a recording head, and forming a gradation image by changing a size of the pixel dot.

As for a conventional image forming apparatus of this kind, an image forming apparatus for forming a monochrome image by controlling recording of the pixel dot in response to resolution, is known. When an image having gradation such as a natural image is recorded by such an apparatus, the pixel dot is positioned by halftone processing such as the ordered dither method, the error diffusion method and the like, and shading of the image is expressed in accordance with the rate of area of the pixel dot in each certain unit area.

When such halftone processing is carried out, quality of the image depends on the resolution of the apparatus. If the apparatus has high resolution, many shades can be expressed in each certain unit area and the image quality having high gradation can be obtained. However, if the apparatus has low resolution, the number of shades in each certain unit area is reduced. For this reason, the unit area needs to be increased to increase the number of shades in each certain unit area and, as a result, apparent resolution is deteriorated.

Further, when an image is a character or a line drawing, the image quality also depends on the resolution of the apparatus. That is, when the apparatus has low resolution, serrate portions called jaggy are generated at hatched parts of a character or a line drawing, which causes deterioration of the image quality.

As a solution of this problem, an image forming apparatus capable of representing a pixel with gradation of a few levels by modulating the recording area of pixel dots in one pixel, is known. In a case of a natural image, the apparent resolution becomes high and smooth gradation can be reproduced, in such an apparatus which can express one pixel with gradation of a few levels. Further, in a case of an image of a character or a line drawing, it is possible to prevent the jaggy from becoming conspicuous by controlling the pixel area at the hatched portion. For example, in an electrophotographic type image forming apparatus using an LED line head on which a number of LEDs (light-emitting diodes) are arranged as recording elements, the light emitting time for one pixel is controlled, the recording position of small-size pixel dots can be controlled in one pixel by the effect of overlapping the optical energy distribution on a photosensitive member and it is thereby possible to prevent the jaggy from becoming conspicuous.

Some recording heads, however, are unable to move the recording position of the small-size pixel dots within one pixel as carried out in the ink-jet system. If the gradation is to be expressed by changing the pixel dot size with such a recording head, a space is made between pixel dots when small-size pixel dots are in close contact with one another, and blur may be thereby generated in the image quality. In order to prevent the generation of blur as much as possible, it is possible to prevent a space from being formed between the pixel dots by comparatively increasing the size of the maximum pixel dot or small pixel dots. However, if the size of the pixel dots at each gradation is determined, the gradation is good in a case of an image of a character or a line drawing while it is worsened in a case of a natural image since the determined size is different from an optimum size.

BRIEF SUMMARY OF THE INVENTION

The object of the present invention is to provide an image forming apparatus using a recording head, which can carry out image formation excellent in gradation in a case of a natural image, image formation generating no jaggy or blur at hatched portions and the like in a case of an image of a character or a line drawing, and image formation with high image quality regardless of the kind of the image.

According to the invention described in claim 1, there is provided an image forming apparatus comprising: setting means for setting plural kinds of pairs of control signals to be used to change a size of the dot on the basis of gradation information, in response to the kind of an image to be formed on the recording medium; selecting means for selecting a desired pair of control signals set by the setting means in response to the kind of the image to be formed on the recording medium; and a head driving unit for changing a size of the pixel dot recorded on the recording medium by driving the recording head in accordance with one control signal corresponding to the gradation information, of the pair of control signals output from the selecting means.

According to the invention of claim 1, using a recording head, it is possible to make image formation excellent in gradation in a case of a natural image, image formation generating no jaggy or blur at hatched portions and the like in a case of an image of a character or a line drawing, and image formation with high image quality regardless of the kind of the image.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a block diagram showing a second embodiment of the present invention;

FIGS. 7A and 7B are views showing an example of pattern to explain smoothing process in the embodiment;

FIGS. 8A and 8B are views showing an example of recording of the pixel dots to explain smoothing process in the embodiment.

DETAILED DESCRIPTION OF THE INVENTION

Figure 1:
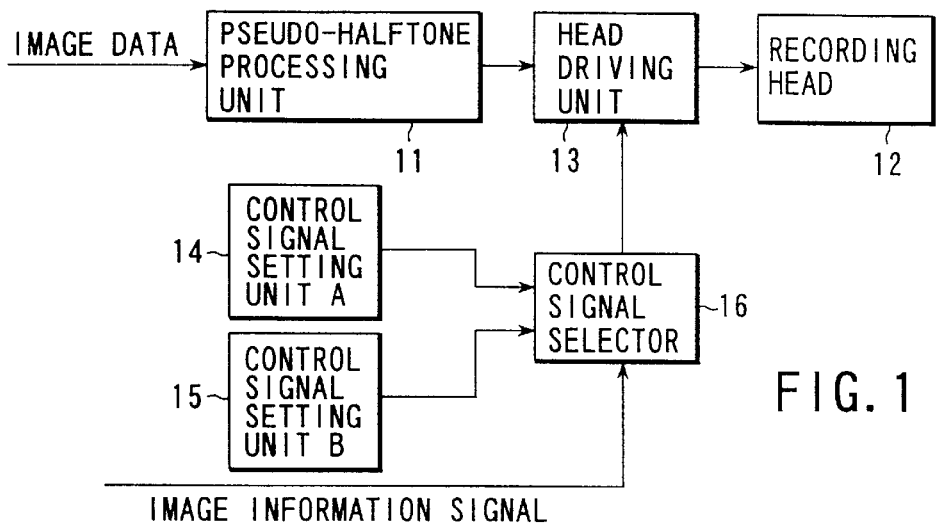
FIG. 1 is a block diagram showing a first embodiment of the present invention.

Embodiments of the present invention will be described below with reference to the drawing.

Image data is supplied to a pseudo-halftone processing unit 11 as shown in FIG. 1. At this time, the image data that is input by image inputting means such as an image scanner or received by a personal computer, and the data has, for example, gradation information 0 to 255 in one pixel.

The pseudo-halftone processing unit 11 converts the input image data into the number of kind of the dot size which a recording head 12 can record, i.e. 0 to 3 in one pixel and outputs it to a head driving unit 13. The pseudo-halftone processing unit 11 converts an image of 256 tones into an image of four tones by carrying out, for example, the multi-level pseudo-halftone processing that expands the ordered dither method or error diffusion method of two values to that of four values.

The head driving unit 13 generates an electric signal to be used to actually drive and control the recording head 12 or, for example, an electric signal whose pulse width is varied in accordance with tones 0 to 3 in a method in which the recording head 12 varies the dot size on the basis of the pulse width. That is, head driving unit 13 generates an electric signal whose pulse width is A1 $\mu$sec when the gradation information is 1, an electric signal whose pulse width is A2(>A1) $\mu$sec when the gradation information is 2, and an electric signal whose pulse width is A3(>A2) $\mu$sec when the gradation information is 3. The electric signal whose pulse width is 0 $\mu$sec indicates that the pulse signal used to drive the recording head is not generated.

The recording head 12 is a line recording head in which a plurality of recording elements are arranged in lines, so that each recording element is driven by the electric signal from the head driving unit 13. As for the relationship between the recording head 12 and a recording medium on which the recording head 12 records the pixel dots, the recording medium is moved relatively in a direction substantially orthogonal to the direction of arrangement of the recording elements of the recording head 12. "Relatively" indicates that either the recording medium or the recording head may be moved.

In addition, a control signal A setting unit 14 for setting a group of control signals A and a control signal B setting unit 15 for setting a group of control signals B are provided as setting means. The control signals of either the setting unit 14 or 15 are selected and supplied to the head driving unit 13 by a control signal selector 16 serving as selecting means. The selection of the control signal selector 16 is carried out on the basis of an image information signal that is to be used to identify the kind of images to be recorded.

For example, as for the group of the control signals A, the control signals are set to generate at the head driving unit 13 an electric signal whose pulse width is 0 $\mu$sec when the gradation information is 0, an electric signal whose pulse width is A1 $\mu$sec when the gradation information is 1, an electric signal whose pulse width is A2(>A1) $\mu$sec when the gradation information is 2, and an electric signal whose pulse width is A3(>A2) $\mu$sec when the gradation information is 3. As for the group of the control signals B, the control signals are set to generate at the head driving unit 13 an electric signal whose pulse width is 0 $\mu$sec when the gradation information is 0, an electric signal whose pulse width is B1 $\mu$sec when the gradation information is 1, an electric signal whose pulse width is B2(>B1) $\mu$sec when the gradation information is 2, and an electric signal whose pulse width is B3(>B2) $\mu$sec when the gradation information is 3.

The image information signals are generated by, for example, noticing each pixel of the image data, extracting a plurality of pixels in a certain range around the noticed pixel, and discriminating whether or not the noticed pixel is an image of a character or a line drawing or a natural image by the pattern discrimination and the like. The generation of the image information signals is not limited to this. They may be produced by, for example, temporarily storing in memories the image data which has been input from the image input means and selecting an area of an image of a character or line drawing, or a natural image from the image data stored by the user. In addition, if the image data is transmitted from a personal computer, information informing that the image data is an image of a character or line drawing or a natural image can be added synchronously with the image data and, therefore, the image information signals may be generated by judging that the image data is an image of a character or line drawing or a natural image, from the information added to the received image data. In this case, even if images of characters or line drawings or natural images are mixed on the same page or if these images are distinguished for the recording on each page, the image data can be judged from the information added to the received image data.

Figure 2:
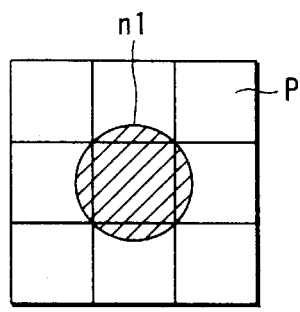
FIG. 2 is a view showing a maximum pixel dot to be recorded on the basis of a control signal A selected when an image is a natural image in the embodiment.

The control signal A which has been set by the control signal A setting unit 14 is a signal selected when an image is a natural image such as a picture image. The size of a maximum pixel dot to be recorded on the basis of this signal is set to be substantially equal to that of a hatched circle n1 in FIG. 2, which covers square pixel P corresponding to the resolution of the apparatus. Therefore, no white portions are formed in a solid image area and the images of high density can be thereby formed.

Figure 3:
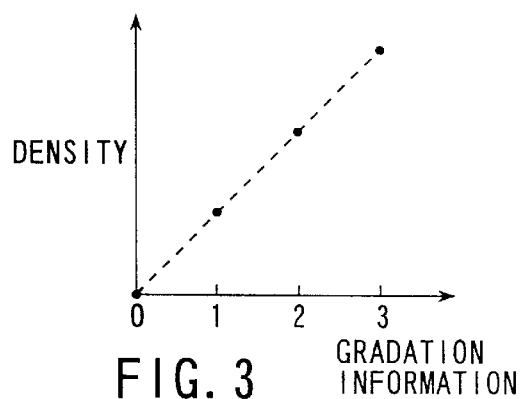
FIG. 3 is a graph showing a relationship between gradation information and density to be recorded on the basis of the control signal A selected when an image is a natural image in the embodiment.

Further, the size of pixel dots other than the maximum pixel dot is set to be proportional to the gradation information of images, on the basis of the size of the maximum pixel dot. For example, if the gradation information represents the density, the dot size is set to represent the density in a straight line linking the density at the maximum dot size and the density determined when there is no record (gradation information=0), as shown in FIG. 3.

As described above, in the control signal A setting unit 14, the control signal A is set to record the pixel dots of the above-described size corresponding to the gradation information 0 to 3. A case where the gradation information is proportional to the density has been explained as an example, but setting the signal is not limited to this. For example, if the gradation information represents the rate of dot area, the signal may be set to determine the dot size proportional to the rate of dot area.

Figures 4A, 4B, 5:
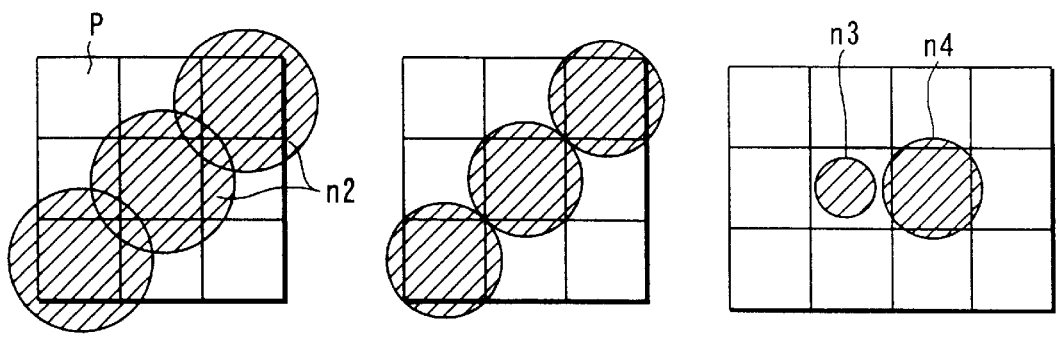
FIGS. 4A and 4B are views showing comparison of the maximum pixel dot to be recorded when an image is a natural image with a maximum pixel dot to be recorded on the basis of a control signal B when an image is a character or a line drawing in the embodiment.
FIG. 5 is a view showing a state in which a pair of pixel dots to be recorded on the basis of a control signal B when an image is a character or a line drawing in the embodiment, are arranged side by side.

Each of the control signals B set in the control signal B setting unit 15 is a signal selected when the image is a character or a line drawing. The size of the maximum pixel dot recorded on the basis of this signal is set to be larger than that of circles covering square pixels P, corresponding to the resolution of the apparatus, as illustrated by hatched circles n2 in FIG. 4A. The oblique narrow lines can be thereby formed smoothly. FIG. 4B illustrates a recording state in which the size of the maximum pixel dot is substantially the same as that of circles covering square pixels P corresponding to the resolution of the apparatus. When both cases are compared, it is understood that the outline of the dot whose size is larger than that of the circles covering the square pixels P as illustrated in FIG. 4A, is smoother than the outline of the dot whose size is substantially the same as that of the circles covering the square pixels P as illustrated in FIG. 4B.

The size of the pixel dots other than the maximum pixel dot, is set such that when the pixel dots are paired and arranged side by side, their outer peripheries can contact one another. For example, when the gradation information for one pixel is set to range from 0 to 3 by the pseudo-halftone processing unit 11, the gradation information items 1 and 2 are paired, the size of the pixel dot if the gradation information 1 is set as represented by a hatched circle n3 in FIG. 5, and the size of the pixel dot if the gradation information 2 is set as represented by a hatched circle n4 in FIG. 5. It is certain that the sizes of the pixel dots are smaller than the size of the maximum pixel dot at this time.

As described above, the control signals B allowing the pixel dots having the above-described sizes based on the gradation information 0 to 3 to be recorded, are set in the control signal B setting unit 15.

In this structure, when the data of a natural image such as a picture image is input to the pseudo-halftone processing unit 11, the control signal selector 16 selects a pair of control signals A of the control signal A setting unit 14 on the basis of the image information signal and supplies them to the head driving unit 13. The head driving unit 13 generates an electric signal to drive the record head 12 on the basis of the gradation information 0 to 3 from the pseudo-halftone processing unit 11 and the paired control signals A from the control signal selector 16. The record head 12 records the pixel dots on the recording medium on the basis of the electric signal.

As described above, when a natural image such as a picture image is recorded, a pair of control signals A of the control signal A setting unit 14 suitable for the recording of the image is selected to generate an electric signal. Therefore, the maximum density can be obtained in the solid area, and the density varying proportionally to the density of the pixel dots can be obtained in the halftone area, and thereby the smooth tone property can be obtained.

Furthermore, when the image data of a character or a line is input to the pseudo-halftone processing unit 11, the control signal selector 16 selects the paired control signals B of the control signal B setting unit 15 on the basis of the image information signal, and supplies them to the head driving unit 13. The head driving unit 13 generates an electric signal to drive the recording head 12 on the basis of the gradation information 0 to 3 from the pseudo-halftone processing unit 11 and the paired control signals B from the control signal selector 16. The recording head 12 records the pixel dots on the recording medium on the basis of this electric signal.

As described above, when an image such as a character or a line drawing is recorded, the paired control signals B of the control signal B setting unit 15 that are suitable for the recording of the image are selected to generate an electric signal. Therefore, a hatched part of a character or a line drawing becomes smooth, and preferable image quality including no blur can be obtained.

As a result, a high quality image can be formed regardless of the kind of the input image data, which is a natural image or an image of a character or a line drawing.

Next, a second embodiment of the present invention will be described.

The same reference numerals denote the same parts as those of the above-described first embodiment, and different portions will be described below.

As shown in FIG. 6, the gradation information items 0 to 3 from the pseudo-halftone processing unit 11 are supplied to the image signal selector 17 and, also, to the smoothing processing unit 18 serving as edge portion interpolating means.

The smoothing processing unit 18 determines whether or not the noticed pixel should be interpolated with reference to the interpolated pixel at the edge portion and pixels around the noticed pixel. If the smoothing processing unit 18 determines that the noticed pixel should be interpolated, it carries out the interpolation to rewrite the gradation information value of the noticed pixel and supplies the interpolated gradation information to the image signal selector 17. For example, the smoothing processing unit 18 extracts a 3×3 matrix around the noticed pixel and determines whether or not the noticed pixel should be interpolated by referring to the gradation information pattern of the noticed pixel and eight pixels around the noticed pixel in the matrix. It is assumed, for example, that the gradation information pattern of the noticed pixel * and eight pixels around the noticed pixel in the matrix, based on the gradation information from the pseudo-halftone processing unit 11, may be set as shown in FIG. 7A. The smoothing processing unit 18 determines that the noticed pixel * should be interpolated and rewrites the gradation information value of the noticed pixel from "0" to "2" as shown in FIG. 7B. With this operation, the state of the pixel dot to be recorded is changed from that shown in FIG. 8A to that in FIG. 8B, and the interpolation of a small pixel dot is carried out.

The processing carried out by the smoothing processing unit 11 can be implemented by forming the relationship between the interpolation pattern and the interpolation value as, for example, a table memory such as a ROM.

The image signal selector 17 is set to select either the gradation information from the pseudo-halftone processing unit 11 or that from the smoothing processing unit 18 and supplies it to the head driving unit 13. That is, when the image signal selector 17 determines that the input image is a natural image on the basis of the image information signal, it selects the gradation information from the pseudo-halftone processing unit 11 and supplied it to the head driving unit 13. When the image signal selector 17 determines that the input image is an image of a character or a line drawing on the basis of the image information signal, it selects the gradation information from the smoothing processing unit 18 and supplied it to the head driving unit 13.

In this structure, the input image data is converted by the pseudo-halftone processing unit 11 into four-value gradation information, which is supplied directly to the image signal selector 17 and, also supplied thereto after subjected to the edge interpolation at the smoothing processing unit 18.

If the image data is the data of a natural image such as a picture image, the image signal selector 17 selects the gradation information from the pseudo-halftone processing unit 11 on the basis of the image information signal and supplies it to the head driving unit 13. On the other hand, the control signal selector 16 selects the paired control signals A of the control signal A setting unit 14 on the basis of the image information signal and supplies them to the head driving unit 13.

By this operation, the head driving unit 13 generates an electric signal to drive the recording head 12 the gradation information 0 to 3 from the pseudo-halftone processing unit 11 and the paired control signals A from the control signal selector 16. The recording head 12 records the pixel dot on the recording medium on the basis of this electric signal.

Therefore, also in this embodiment, when a natural image such as a picture image is recorded, a pair of control signals A of the control signal A setting unit 14 which are suitable for the recording of the image are selected to generate an electric signal. As a result, the maximum density can be obtained in a solid area, the density varied proportionally to the density of the pixel dot can be obtained in the halftone area and thereby the smooth tone property can be obtained.

Furthermore, if the image data is data of a character or a line drawing, the image signal selector 17 selects the gradation information subjected to the edge interpolation by the smoothing processing unit 18 on the basis of the image information signal, and supplies it to the head driving unit 13. On the other hand, the control signal selector 16 selects a pair of control signals B of the control signal B setting unit 15 on the basis of the image information signal, and supplies them to the head driving unit 13.

With this operation, the head driving unit 13 generates an electric signal to drive the recording head 12 on the basis of the gradation information 0 to 3 from the smoothing processing unit 18 and the paired control signals B from the control signal selector 16. The recording head 12 records the pixel dot on the recording medium on the basis of this electric signal.

Therefore, even in the present embodiment, when an image such as a character or a line drawing is recorded, a pair of control signals B of the control signal B setting unit 15 that are suitable for the recording of the image are selected to generate an electric signal. As a result, the hatched portion of a character or a line drawing becomes smooth, and preferable image quality including no blur can be obtained.

Figure 9A:
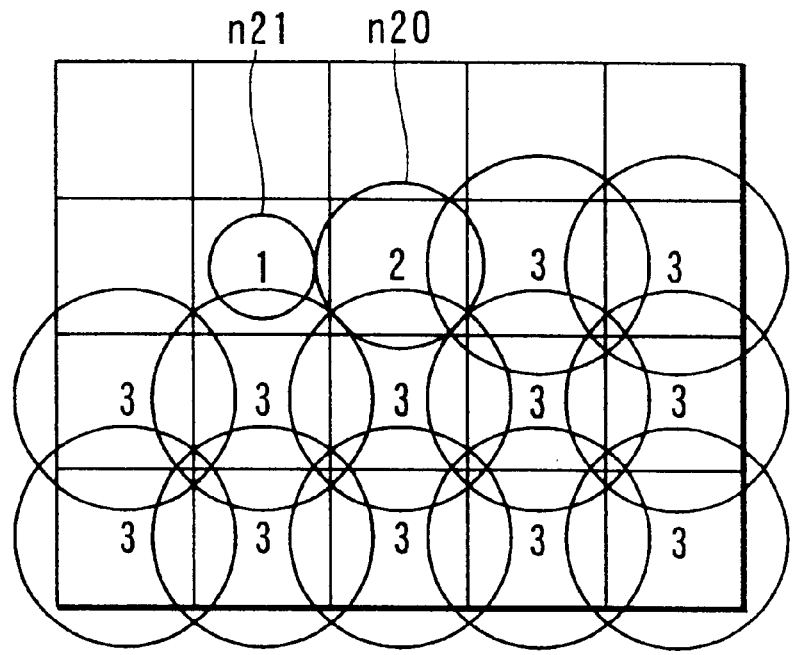
FIGS. 9A and 9B are views showing comparison of a recording example when the smoothing process is carried out with that when the smoothing process is not carried out.
Figure 9B:
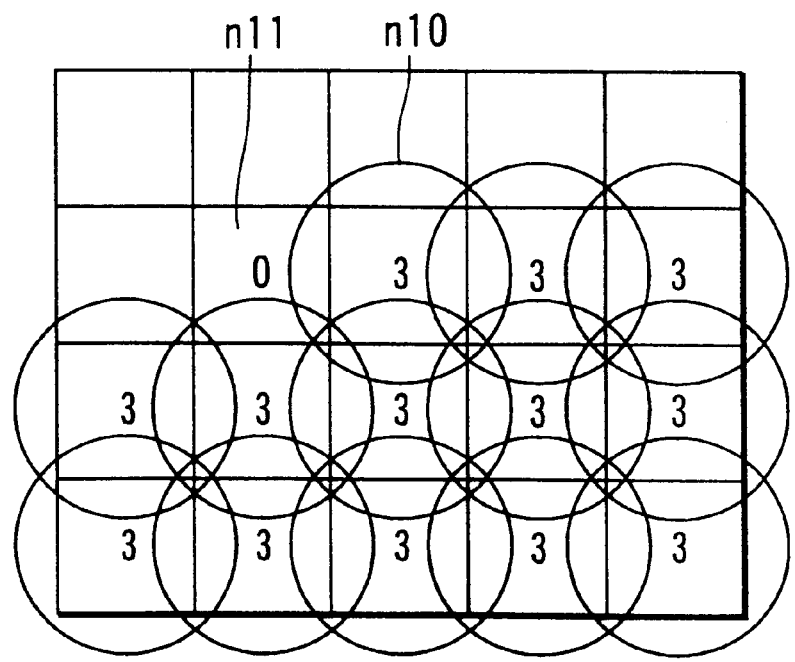

Moreover, in the present embodiment, the gradation information subjected to the edge interpolation by the smoothing processing unit 18 is used in the case of an image such as a character or a line drawing. As a result, if pixel dot n10 of the gradation information 3 is converted to pixel dot n20 of the gradation information 2 and pixel dot n11 of the gradation information 0 is interpolated with pixel dot n21 of the gradation information 1, as shown in FIG. 9A illustrating a case where the gradation information is subjected to edge interpolation, and in FIG. 9B illustrating a case where it is not subjected to edge interpolation, the hatched portion of a character or a line drawing becomes smooth, and preferable image quality including no blur can be obtained.

Consequently, in the present embodiment, even if the image data is a natural image or an image of a character or a line drawing, a high quality image can be formed regardless of the kind of the image.

In the first and second embodiments, the recording head 12 may be a thermal head.

In each of the above-described embodiments, a case of converting the gradation information of the image data at four gradations of 0 to 3 for one pixel, at the pseudo-halftone processing unit, has been described as an example. For example, however, the present invention can be applied to a case of converting it at eight gradations of 0 to 7 and, of course, the present invention is not limited to this.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus having a recording head on which a plurality of recording elements are arranged, to record pixel dots on a recording medium relatively moved in a direction substantially orthogonal with a direction of arrangement of the recording elements of the recording head and to thereby form two-dimensional images, comprising:

setting means for setting a plurality of kinds of pairs of control signals to be used to change a size of the dot on the basis of gradation information, in response to a kind of an image to be formed on the recording medium;

selecting means for selecting a desired pair of control signals set by the setting means in response to the kind of image to be formed on the recording medium;

a head driving unit for changing a size of the pixel dot recorded on the recording medium by driving the recording head in accordance with one control signal corresponding to the gradation information, of the pair of control signals output from the selecting means; and edge portion interpolating means for interpolating an edge portion of input image data, wherein the pairs of control signals are set by the setting means in response to the formed image, which is any one of an image of a character, a line drawing and the like, and a natural image, and wherein when the image to be formed on the recording medium is a natural image, the head driving unit changes a size of the pixel dot of the natural image on the basis of each pair of control signals selected by the selecting means, and when the image to be formed on the recording medium is an image of a character, a nine drawing and the like, the head driving unit changes a size of the pixel dot of the image subjected to the interpolation of the edge portion by the edge portion interpolating means on the basis of each pair of control signals selected by the selecting means.

2. An image forming apparatus having a recording head on which a plurality of recording elements are arranged, to record pixel dots on a recording medium relatively moved in a direction substantially orthogonal with a direction of arrangement of the recording elements of the recording head and to thereby form two-dimensional images, comprising:

setting means for setting a plurality of kinds of pairs of control signals to be used to change a size of the dot on the basis of gradation Information, in response to a kind of an image to be formed on the recording medium;

selecting means for selecting a desired pair of control signals set by the setting means in response to the kind of image to be formed on the recording medium; and a head driving unit for changing a size of the pixel dot recorded on the recording medium by driving the recording head in accordance with one control signal corresponding to the gradation information, of the pair of control signals output from the selecting means, wherein the pairs of control signals are set by the setting means in response to the formed image, which is any one of an image of a character, a line drawing and the like, and a natural image, and wherein, of the pairs of control signals set by the setting means, the pair of control signals selected when the image to be formed is an image of a character, a line drawing and the like, are set to have a size larger than that of a circle covering a square pixel corresponding to resolution of the apparatus, for a maximum pixel dot size, and combination of a pair of control signals is determined and control signals having a size such that when paired pixel dots are arranged side by side their outer peripheries are in contact with one another, for remaining pixel dot sizes, wherein a pair of control signals selected when the image to be formed is a natural image are set to have a size substantially the same as that of a circle covering a square pixel corresponding to the resolution of the apparatus, for the maximum pixel dot size, and wherein control signals are set to have a size proportional to gradation information of an image on the basis of the maximum pixel dot size, for the remaining pixel dot sizes.

3. An image forming apparatus having a recording head on which a plurality of recording elements are arranged, to record pixel dots on a recording medium relatively moved in a direction substantially orthogonal with a direction of arrangement of the recording elements of the recording head and to thereby form two-dimensional images, comprising:

setting means for setting a plurality of kinds of pairs of control signals to be used to change a size of the dot on the basis of gradation information, in response to a kind of an image to be formed on the recording medium;

selecting means for selecting a desired pair of control signals set by the setting means in response to the kind of image to be formed on the recording medium;

a head driving unit for changing a size of the pixel dot recorded on the recording medium by driving the recording head in accordance with one control signal corresponding to the gradation information, of the pair of control signals output from the selecting means; and edge portion interpolating means for interpolating an edge portion of input image data, wherein the pairs of control signals are set by the setting means in response to the formed image, which is any one of an image of a character, a line drawing and the like, and a natural image, and wherein when the image, to be formed on the recording medium is a natural Image, the head driving unit changes a size of the pixel dot of the natural image on the basis of each of the pair of control signals selected by the selecting means, and when the image to be formed on the recording medium is an image of a character, a line drawing and the like, the head driving unit changes a size of the pixel dot of the image subjected to the interpolation of the edge portion by the edge portion interpolating means on the basis of each of the pair of control signals selected by the selecting means, and wherein, of the pairs of control signals set by the setting means, the pair of control signals selected when the image to be formed is an image of a character, a line drawing and the like, are set to have a size larger than that of a circle covering a square pixel corresponding to resolution of the apparatus, for a maximum pixel dot size, and combination of a pair of control signals is determined and control signals having a size such that when paired pixel dots are arranged side by side, their outer peripheries are in contact with one another, for remaining pixel dot sizes, and wherein a pair of control signals selected when the image to be formed is a natural image are set to have a size substantially the same as that of a circle covering a square pixel corresponding to the resolution of the apparatus, for the maximum pixel dot size, and control signals are set to have a size proportional to gradation information of an image on the basis of the maximum pixel size, for the remaining pixel dot sizes.

* * * * *